(12) United States Patent
Goranov

(10) Patent No.: US 10,917,242 B2
(45) Date of Patent: Feb. 9, 2021

(54) METHOD, A COMPUTER PROGRAM PRODUCT AND A QKEY SERVER

(71) Applicant: Ubiqu B.V., Rotterdam (NL)

(72) Inventor: Boris Petrov Dokov Goranov, Rotterdam (NL)

(73) Assignee: Ubiqu B.V., Rotterdam (NL)

( * ) Notice: Subject to any disclaimer, the term of this patent is extended or adjusted under 35 U.S.C. 154(b) by 0 days.

(21) Appl. No.: 15/570,154

(22) PCT Filed: Apr. 29, 2016

(86) PCT No.: PCT/NL2016/050308
§ 371 (c)(1),
(2) Date: Oct. 27, 2017

(87) PCT Pub. No.: WO2016/175660
PCT Pub. Date: Nov. 3, 2016

(65) Prior Publication Data
US 2018/0139049 A1  May 17, 2018

(30) Foreign Application Priority Data

Apr. 30, 2015 (NL) .................................. 2014742

(51) Int. Cl.
*H04L 9/32* (2006.01)
*H04L 29/06* (2006.01)
(Continued)

(52) U.S. Cl.
CPC .............. *H04L 9/3234* (2013.01); *G09C 1/00* (2013.01); *H04L 9/0897* (2013.01); *H04L 9/14* (2013.01);
(Continued)

(58) Field of Classification Search
CPC ....... H04L 9/3234; H04L 9/0897; H04L 9/14; H04L 9/3226; H04L 9/3247; H04L 63/0853; G09C 1/00
See application file for complete search history.

(56) References Cited

U.S. PATENT DOCUMENTS

| 6,694,436 | B1 * | 2/2004 | Audebert | G06Q 20/04 707/999.202 |
| 7,702,916 | B2 * | 4/2010 | Seaton, Jr. | G06Q 20/3823 713/185 |

(Continued)

FOREIGN PATENT DOCUMENTS

| EP | 2568406 A1 | 3/2013 |
| GB | 2396354 A | 6/2004 |

(Continued)

OTHER PUBLICATIONS

Ahmad et al., Enhancing the Security of Mobile Applications by using TEE and (U)SIM, Dec. 2013, International Conference on Ubiquitous Intelligence and Computing and Autonomic and Trusted Computing, pp. 575-582 (Year: 2013).*

(Continued)

*Primary Examiner* — Kenneth W Chang
(74) *Attorney, Agent, or Firm* — Banner & Witcoff, Ltd.

(57) ABSTRACT

The invention relates to a method for tightly coupling context to a secure pin and securely storing an asset in hardware. The method comprises a step of sending the context to a secure element, a step of ensuring that the context is shown to a user, and a step of acquiring user consent by performing an authentication check. Further, the method comprises a step of combining an authentication result with the secured context, and a step of performing an operation on the context with the asset if the authentication was successful.

18 Claims, 2 Drawing Sheets

(51) Int. Cl.
*H04L 9/14* (2006.01)
*G09C 1/00* (2006.01)
*H04L 9/08* (2006.01)

(52) U.S. Cl.
CPC .......... *H04L 9/3226* (2013.01); *H04L 9/3247* (2013.01); *H04L 63/0853* (2013.01); *H04L 2209/127* (2013.01); *H04L 2209/16* (2013.01)

(56) References Cited

U.S. PATENT DOCUMENTS

| | | | | |
|---|---|---|---|---|
| 8,543,500 | B2* | 9/2013 | Ogilvy | G06Q 20/10 705/40 |
| 8,806,216 | B2 | 8/2014 | Daouphars et al. | |
| 2002/0080190 | A1 | 6/2002 | Hamann et al. | |
| 2002/0194499 | A1* | 12/2002 | Audebert | H04L 63/0853 726/35 |
| 2003/0055738 | A1* | 3/2003 | Alie | G06Q 20/04 705/26.1 |
| 2005/0047579 | A1* | 3/2005 | Salame | H04L 29/06027 379/265.09 |
| 2006/0083208 | A1* | 4/2006 | Lin | H04W 76/11 370/338 |
| 2008/0208758 | A1* | 8/2008 | Spiker | G06F 21/83 705/70 |
| 2012/0106441 | A1* | 5/2012 | Juneja | H04L 12/4625 370/328 |
| 2012/0239565 | A1* | 9/2012 | Davis | G06Q 20/02 705/41 |
| 2013/0061058 | A1* | 3/2013 | Boivie | G06F 21/74 713/189 |
| 2014/0096222 | A1* | 4/2014 | Colnot | G06F 21/31 726/9 |
| 2014/0214688 | A1* | 7/2014 | Weiner | G06Q 20/3227 705/71 |
| 2015/0181422 | A1* | 6/2015 | Rombouts | H04L 9/3271 380/270 |

FOREIGN PATENT DOCUMENTS

| | | |
|---|---|---|
| GB | 2496354 A | 5/2013 |
| NL | 2011717 C | 5/2015 |
| WO | 2004/090696 A1 | 10/2004 |
| WO | 2013 188 599 A2 | 12/2013 |

OTHER PUBLICATIONS

"Making phones as secure as smart cards", Feb. 27, 2015 (Feb. 27, 2015), XP055259044, Retrieved from the Internet: URL:http://www.trustindigitallife.eu/uploads/TDW2015f/Presentation-Matti_vanderGronde.pdf [retrieved on Mar. 16, 2016] p. 3-p. 6.

Forget et al: "The Virtual Smart Card", Card Technology Today, Elsevier, vol. 19, No. 7-8, Jul. 1, 2007 (Jul. 1, 2007), p. 12, XP022201907, ISSN: 0965-2590, DOI: 10.1016/S0965(07)70116-0 p. 1.

Aug. 26, 2016—International Search Report and Written Opinion of PCT/NL2016/050308.

* cited by examiner

US 10,917,242 B2

METHOD, A COMPUTER PROGRAM PRODUCT AND A QKEY SERVER

CROSS-REFERENCE TO RELATED APPLICATIONS

This application is a U.S. National Stage application under 35 U.S.C. § 371 of International Application PCT/NL2016/050308 (published as WO 2016/175660 A1), filed Apr. 29, 2016 which claims the benefit of priority to Application NL 2014742, filed Apr. 30, 2015. Benefit of the filing date of each of these prior applications is hereby claimed. Each of these prior applications is hereby incorporated by reference in its entirety.

Secure elements are an integral part of IT solutions for they provide secure storage for cryptographic keys and in case of SIM cards and smartcards they secure user authentication, signatures and secure messages.

Conceptually this solution comprises of a device, an application programming interface API, a display, a keypad, a secure element and an asset. In traditional smartcard and sim card solutions the asset is stored on the secure element. Pin entry and display is implemented on the device and through the API the operation of the asset is performed in the context, after PIN entry.

A key element for a secure solution is that the context is tightly coupled to secure pin entry and the asset is securely stored in hardware. To achieve this a so-called finread specification was established eliminating the threat of man in the middle attacks. However, finread readers are expensive and are not available for tablets, thus wide spread use is not achieved.

It is an object of the invention to provide an improved solution for tightly coupling the context to the secure pin and securely storing the asset in hardware. Thereto, according to the invention, a method is provided, called qKey, wherein context and pin are tightly coupled orchestrating secure entry while displaying and ensuring use of a secure element for the asset. qKey is a secure element with sole control technology optionally including a secure second screen. The second screen can also be integrated within the same device, wherein a first app is active on the device and a second app is active on the display and entry component.

Generally, the method includes the steps of sending the context to a secure element, ensuring that the context is shown to a user, acquiring user consent by performing an authentication check, combining an authentication result with the secured context, and performing an operation on the context with the asset if the authentication was successful.

Basically, the secure element was securely associated with the display and entry device in an earlier phase, wherein the secure element has access to authentication data, and wherein the ensuring step and the acquiring step are performed by the secure element. Also a step of checking the outcome of the authentication check is performed by the secure element. Further, the performing step can be carrier out by the secure element. Upon receipt of the context, the secure element stores the context to perform the operation later, after successful authentication, as described above. Here, the secure element has a secure association with the display and entry device, or app. Optionally, the qKey server receives the context via its API and processes the communication, including having access to authentication data, the ensuring step, the acquiring step and/or the performing step.

In a particular embodiment, the conventional middleware API is modified such that the context is entered prior to PIN entry. Instead of sending the context to the secure element directly, there is an alternative approach wherein the context is sent to a Qkey server, via the qkey API. Here, the qkey server was securely associated with the secure element in an earlier phase. This secure association is used to securely sent the context to the secure element through the qkey server. The qkey server now ensures that the context is shown to the user via the middle ware in this case, and the user can now approve the context with his or her PIN, the PIN is combined with the secured context and secure element performs the operation on the context with the asset. A man in the middle attack is thwarted, because a hash can not be substituted by an attacker.

In a further embodiment, the secure element is located at the qkey.

In addition, the invention relates to a qKey server.

Further, the invention relates to computer program products. A computer program product may comprise a set of computer executable instructions stored on a data carrier, such as a CD or a DVD. The set of computer executable instructions, which allow a programmable computer to carry out the methods as defined above, may also be available for downloading from a remote server, for example via the Internet or through an app.

Other advantageous embodiments according to the invention are described in the following claims By way of example only, embodiments of the present invention will now be described with reference to the accompanying figures in which FIG. 1 shows a traditional setup;

It is noted that the figures show merely a preferred embodiment according to the invention. In the figures, the same reference numbers refer to equal or corresponding parts.

Figure 1:
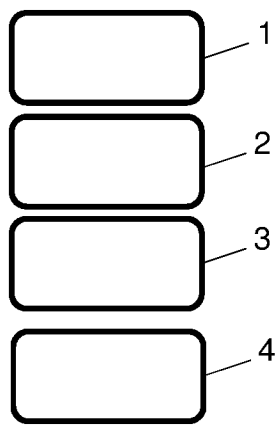

FIG. 1 traditional setup, comprising a device 1 running an application for providing a context, middleware 2 including an application programming interface API, a display and pin entry 3, and a secure element 4 interacting with an asset containing secret information.

qKey introduces a new element, a qkey service. qKey tighly couples or connects context and pin, orchestrates secure entry and displays and ensures use of a secure element for the asset. The qkey is a secure element with sole control technology and a secure second screen, even within the same device.

Figure 2:
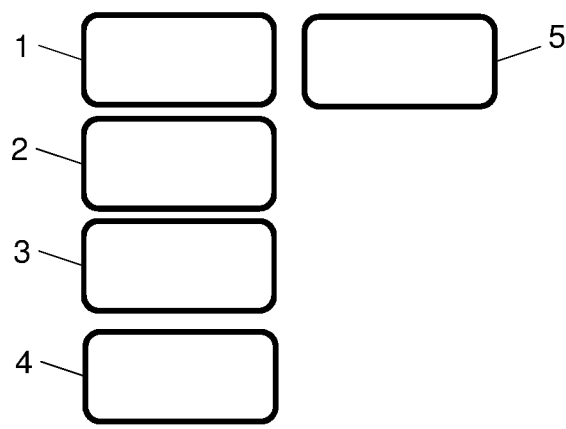
FIG. 2 shows a first setup according to the invention.

FIG. 2 shows a first setup according to the invention. Here, the traditional smart card configuration used on a PC with middleware and a reader is used in another way. The first setup according to the invention includes a qKey api 5.

The middleware API is modified such that the context is entered prior to PIN entry. Instead of sending the context to the secure element directly, there is an alternative approach wherein the context is sent to a Qkey server, through the qkey API. Here, the qkey server was securely associated with the secure element in an earlier phase. This is a one to one connection. This secure association is used to securely sent the context to the secure element via the qkey server. The qkey server now ensures that the context is shown to the user via the middle ware in this case, and the user can now approve the context with his or her PIN, the PIN is combined with the secured context and secure element performs the operation on the context with the asset. A man in the middle attack is thwarted, because a hash can not be substituted by an attacker.

A improvement to the first setup shown in FIG. 2 could be that when the secure element is associated with the qkey, this association comprises also an association with a user token, such as a mobile phone, tablet or laptop or dedicated hardware, like a Bluetooth dongle or watch. This user token can then be used for display of the context and entry of the PIN. It is possible to activate numerous devices with the same secure element, so it will be easier to replace a secure element with approval of another but same level secure element.

An improvement to this configuration could be that the secure element itself is located on a different location than the location of the device on which the asset is initiated and on which the middleware has been installed The device which communicates with the middleware of the qkey API then also will be associated with the qkey or secure element SE prior to the entry of the context into one of the API's.

The context can now enter into either the middleware or the qkey API, the qkey server now sending the context to the qkey, the key ensures that the context is sent to the SE and the qkey ensures that the context is displayed to the user is displayed and a user consent is acquired by an authentication check, e.g. by entering a a PIN. After PIN entry by the user, the qkey ensures the assets performs its operation on the previously prepared context in the secure element. The context can be a transaction or a digital signature or another operation that a user wishes to be executed.

The device can be a PC, laptop, mobile phone, watch, set-top box, Point or sales terminal, ATM, website of application. The middleware can be a CSP, PKCS #11, radius, LDAP, MS AD, SOAP/oAUTH/Openid identity provider or similar. The qkey API can be implemented as a webservice or any other suitable abstraction.

The qKey is an application, possibly on a networked computing device possibly attached to a hardware security model HSM for secure crypto storage, or completely implemented in a HSM, which is attached to a network and which implements the qKey API, possibly with a middleware intermediate in front.

The secure element can be a SIM in a mobile phone, a smart card in a laptop, a secure execution environment in a processor as separate chip in a motherboard etc. The display and (software) keyboard can be intermediated via the middle ware or on a mobile phone.

The Asset can be information, a secret and cryptographic secret, a symmetric cryptographic secret, an asymmetric cryptographic secret, a biometric template or something other, possibly of value to the user, related to the secure element. Preferably, when something physical is attached to the secure element, the use of that asset is controlled in a similar fashion.

The secure association of the qkey with the secure element and the display and pin entry device can have the following options.

Statically, where the association is performed at a prior phase, in a possibly secure environment. Dynamically, where in one embodiment the secure element generates the asset and an activation announce message or nonce implying a number used once. This activation announce message is then exported from the secure element and then distributed to the display and pin entry device, where this announce message is entered. The display and the pin entry device can be established using zero-knowledge proves, diffie-helman or any other key-establishment protocols resulting in a shared secured or there form of a secure connection with the secure element. As an example, a secure connection can be obtained using a method as described in the earlier Dutch patent application No. 2011717.

In a particular embodiment, a process may include the following protocol.
Principals
   an unregistered device C (e.g. a telephone used for display and pin entry)
   a Secure element component G(e.g. HSM, secure element)
   a dispatcher component D(qkey)
Context
   Gateway G has a public key PK(G) which is known to device C
   Device C has a nonce N, know to G.
   There is an open subscription request with said nonce N and associated token T on Dispatcher
Steps
   C generates a fresh nonce NC and a temporary encryption key K
   C sends to G: (NC, K, N) encrypted with PK(G)
   G decrypts the message with the private key associated to PK(G)
   G executes the following protocols, which result in G having NS and T
     Subscribing to the open subscription
       G sends to D: N
       D ensures that the nonce N is linked to an open subscription, and if so,
       D sends to G: T
     Establishing the key and linking it to the subcription
       G generates a fresh nonce NS, associated to T and NC
       G computes the communication key from NC and NS and stores it with T
   G sends to C: (NC, NS, T) encrypted with K
   C decrypts the previous message with K
   C computes the communication key from NC and NS Such an association can also be statically and dynamically be established between middleware and qkey API, middleware and secure element, middleware and display and Pin entry device, or between qKey API and display and Pin entry device and between qkey api and secure element.

When the middleware and display and Pin entry device have establishing a secure association this is also referred to as an identification on the middleware side and a device addition on the display and Pin entry token side.

Figure 3:
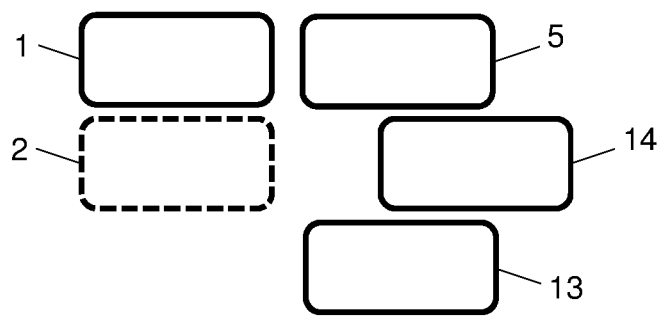
FIG. 3 shows a second setup according to the invention.

FIG. 3 shows a second setup according to the invention. In this advantageous embodiment, a secure element 14 is located in a datacenter, where also the qkey is located. The secure element 14 is implemented in software in a HSM and contains the public key of the qkey and a private exclusive to it selves. The secure element and the qkey are statically associated, knowing each others public keys. On the secure element an asset is created, the asset being an asymmetric public private key pair and an activation an announce message. Optionally, a second public key is pre-stored in the secure element, used to encrypt the activation announce message. The display and entry token can be implemented as an app on a user token such a mobile phone. This user token is associated with the qkey. The activation announce message is entered on the display and entry token 13. If it was encrypted, it has to be decrypted with the private key. This private key could be located in a secure printing facility used to print it on tamper prove paper and stored in a closed tamper evident envelope and the activation announce message could be distributed to the user and only given to the user once the identity of the user is established with sufficient security. When an activation was successful it is possible to create another user token on a different device, like phone or tablet with the same association with the qKey server, or a new association, based in the original association, or simply linked to the original association, or just reuse some data that was established in relation to the association, i.e. someone's identity. After the display and the entry token establishes a secure association with the secure element, using the activation announce message to the secure element, the qKey orchestrates the message exchange.

The app on the user token may have three functions, viz receiving messages from qkey or secure element, displaying context to the user and secure entry of a authentication result, such as a user PIN. The authentication result could be a PIN, a biometric element of the user or a second device, for instance a Bluetooth device in possession of the user queried by the app for presence or user input.

To facilitate secure use of the app, the app has a secure association with the qkey and/or the secure element and/or middleware and the apps stores this association securely, by use of cryptography, possibly obfuscated cryptography to prevent disclosure of the association.

The app is also obfuscated to itself to prevent decryption and use of the association. The obfuscation of the association and the obfuscation of the app can be uniquely generated for each device during associating and can be update on regular intervals.

Preferably, the app checks it's own integrity. One way to check the integrity is by calculating a hash and verifying that this hash is correct. The app may checks it's environment, e.g. by way of reading environment identifying or partially identifying data and comparing this with previously stored data or uploading this to a verification services. The app can be registered on a network. This registration can be push-messaging, GSM SMS or IP network. Part of the association with the qkey or the secure element is the address that belongs to this network registration. In a preferred embodiment, when context is sent to the display and entry token it is always sent to this address, preventing cloning of the app onto another device. The app actively monitors the mobile phone. If the app detects that the phone is compromised, a malice app is present, or when a hostile heuristic is detected, it notifies the qkey of this fact and/or ceases operation, and/or wipes security sensitive parameters. App may use SSL for secure communication and SSL certificate pinning to prevent SSL vulnerabilities. Additionally, the app uses different facilities offered by the OS such secure cryptographic key storage to leverage any additional measure also offered by (the OS of) the user token. Also the qKey server and the device may communicate via SSL. Preferably, the qKey server and/or the secure element sends a message including context to a pre-specified address of the app, so that it is counteracted that the message is delivered at a app clone. This can e.g. be accomplished using a push message, SMS message or via an IP address.

Additionally, in order to prevent trivial attacks a customer keyboard is used, possibly in such an arrangement that the location of the symbols or the location input or direction of the user input doesn't disclose the inputted symbol.

The association of middleware with the qkey of the display and login token, can take many forms, the preferred form is through the identification announce message introduced earlier. This announce message can subsequently be used, to establish an end-2-end secure connection between the mobile phone where the app that acts as a display and login token resides and the device which uses or communicated with the middle ware. As an alternative, an existing username password can be used, where the qkey is used as a second factor.

The asset used determines what the context is and how rich this context is and also what the key elements are that are crucial to display to the user, to make a informed decision whether or not the user wants the asset to perform the operation on the context. For instance when the asset is an RSA private key for authentication, then de context can be a HASH to prove possession of the key, but also a logo to be displayed on the mobile phone and/or a URL, user-agent, IP address timestamp, service description geolocation etc.

The user process of the mobile phone can be as follows:
1. Originally, the context is bound to the asset in the secure element,
2. After reception of an secured and addressed message the app displays the context to the user, or at least a part of the context that is relevant for the user for this type of asset operation,
3. the user gives his approval,
4. After the user approval the secure element performs the operation.

The secure element contains the asset. To facilitate many users, the secure element is enhanced in such a way that the asset can be securely taken out of the secure element and inserted again when it is needed. One way to do this is to generate a symmetric key in the secure element and use this symmetric key with AES in OCB mode. If this symmetric key is only known in the secure element/HSM then the asset is as secure outside the HSM as inside. If this means of securing is the insertion and removal of an asset is securely replicated in control way among HSM a scalable solution is achieved. When this means can be backed up in a secure manner, for instance using smartcards, a business continuity is achieved. The HSM where the asset is located, can also count wrong PIN attempts or activation announce messages, and block operation when to many wrong tries are performed.

Figure 4:
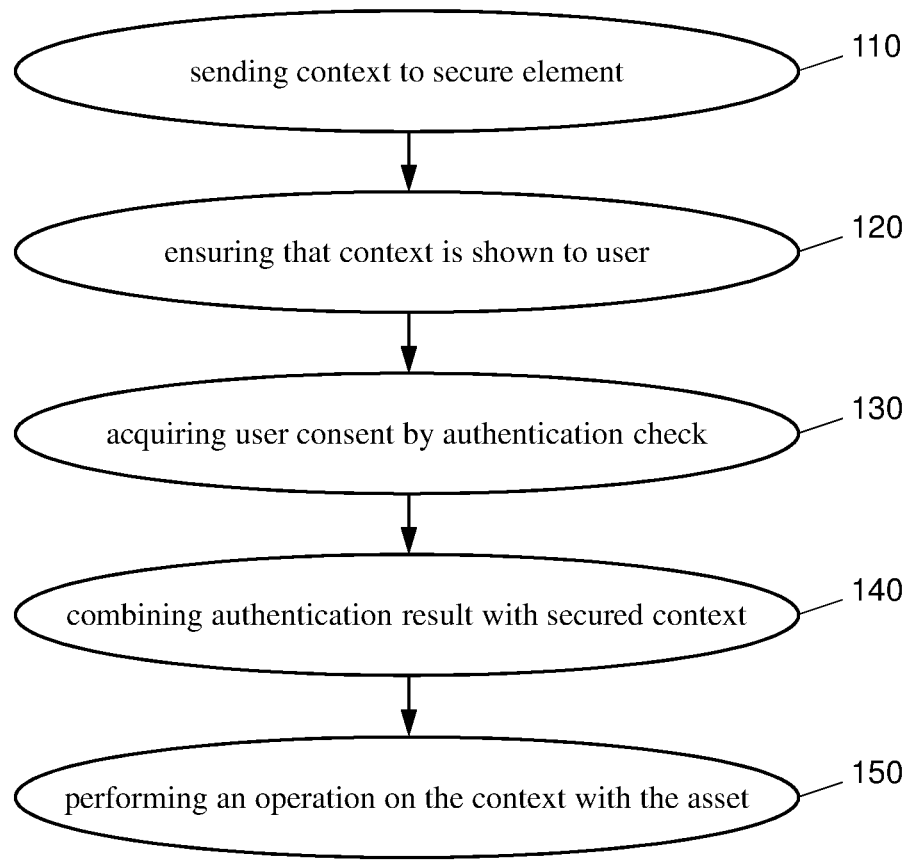
FIG. 4 shows a flow chart of a method according to the invention.

When along with the secure association of the secure element with the qkey, some form of attributes and addressing can additionally be established. The secure element could for instance be deployed in the owners own home, where the qkey based on the context in the request can determine where secure element is located and route it there. Thus an end user doesn't have to trust the qkey service operator with his assets. Multi-tenancy can be achieved when secure element can have different symmetric keys associated with different customers to enable to load distinction collections of assets, thus achieving multi tenancy and economies of scale. FIG. 4 shows a flow chart of a method according to the invention.

The method is used for tightly coupling context to a secure pin and securely storing an asset in hardware, and comprises the steps of sending (110) the context to a secure element, ensuring (120) that the context is shown to a user, acquiring (130) user consent by performing an authentication check, combining (140) an authentication result with the secured context, and performing (150) an operation on the context with the asset if the authentication was successful.

The method can be performed using dedicated hardware structures, such as computer servers. Otherwise, the method can also at least partially be performed using a computer program product comprising instructions for causing a processor of a computer system or a control unit to perform a process including at least one of the method steps defined above. All (sub)steps can in principle be performed on a single processor. However, it is noted that at least one step can be performed on a separate processor, e.g. the step of performing the operation. A processor can be loaded with a specific software module. Dedicated software modules can be provided, e.g. from the Internet.

It will be understood that the above described embodiments of the invention are exemplary only and that other embodiments are possible without departing from the scope of the present invention. It will be understood that many variants are possible.

Such variants will be apparent for the person skilled in the art and are considered to fall within the scope of the invention as defined in the following claims.

The invention claimed is:

1. A method for tightly coupling context to a secure pin and securely storing an asset in hardware, comprising the steps of:
sending the context to a secure element,
ensuring that the context is shown to a user on a display and entry device securely associated with the secure element,
acquiring user consent on the shown context by performing an authentication check via the display and entry device, resulting in an authentication result,
combining the authentication result with the context, and
performing an operation on the context with the asset if the authentication was successful,
wherein the secure element was securely associated with a display and pin entry device in an earlier phase, wherein the secure element has access to authentication data, and wherein the ensuring step, the acquiring step, and a step of checking the outcome of the authentication check are performed by the secure element.

2. A method according to claim 1, wherein the context is sent to the secure element through a qKey server, wherein the qKey server was securely associated with the secure element in an earlier phase, wherein the qKey server has access to authentication data, and wherein the ensuring step and acquiring step are performed by the qKey server.

3. A method according to claim 2, wherein the secure element is located at the qKey server.

4. A method according to claim 2, wherein the context is sent to the secure element through the qKey server using a qKey API, and wherein a device communicating with a middleware or the qKey API is associated with the qKey server or secure element prior to entry of the context into the qKey API.

5. A method according to claim 1, wherein the context is shown to a user via a middleware.

6. A method according to claim 2, wherein the qKey server was securely associated with the secure element according to a step including association with a user token.

7. A method according to claim 6, wherein the association is performed statically or dynamically.

8. A method according to claim 6, wherein the association is performed by performing the steps of:
generating, by the secure element, an asset and an activation announce message,
exporting the activation announce message from the secure element and entering it to a display and pin entry device.

9. A method according to claim 4, wherein a static or dynamic association is established between the middleware and the qKey API, between the middleware and the secure element, between the middleware and a display and pin entry device, between the qKey API and the display and pin entry device, and/or between the qKey API and the secure element.

10. A method according to claim 1, wherein the display and pin entry device is implemented as an app on a user token.

11. A method according to claim 10, wherein the app has the functions of:
receiving an activation announce message from a qKey server or the secure element,
displaying the context to the user, and
secure entry of the authentication result.

12. A method according to claim 11, wherein the app is securely associated with the qKey server, secure element and/or a middleware.

13. A method according to claim 10, wherein the app is obfuscated to itself.

14. A method according to claim 10, wherein the app checks its own integrity.

15. A method according to claim 11, wherein the qKey server and/or the secure element sends the activation announce message including the context to a pre-specified address of the app.

16. A method according to claim 11, wherein the activation announce message is subsequently used to establish an end-2-end connection between a mobile phone having the app and a device which uses or communicates with a middleware.

17. A non-transitory computer readable medium, comprising a computer program embodied thereon for tightly coupling context to a secure pin and securely storing an asset in hardware, the computer program comprising instructions for a processing unit to perform the steps of:
sending the context to a secure element,
ensuring that the context is shown to a user on a display and entry device securely associated with the secure element,
acquiring user consent by performing an authentication check via the display and entry device resulting, in an authentication result,
combining the authentication result with the context, and
performing an operation on the context with the asset if the authentication was successful
wherein the secure element was securely associated with a display and pin entry device in an earlier phase, wherein the secure element has access to authentication data, and wherein the ensuring step, the acquiring step, and a step of checking the outcome of the authentication check are performed by the secure element.

18. A qKey server configured to perform the steps of the method defined in claim 1.

* * * * *